Aug. 11, 1959   K. C. D. HICKMAN   2,899,366
COMPRESSION DISTILLATION
Filed May 25, 1955   4 Sheets-Sheet 1
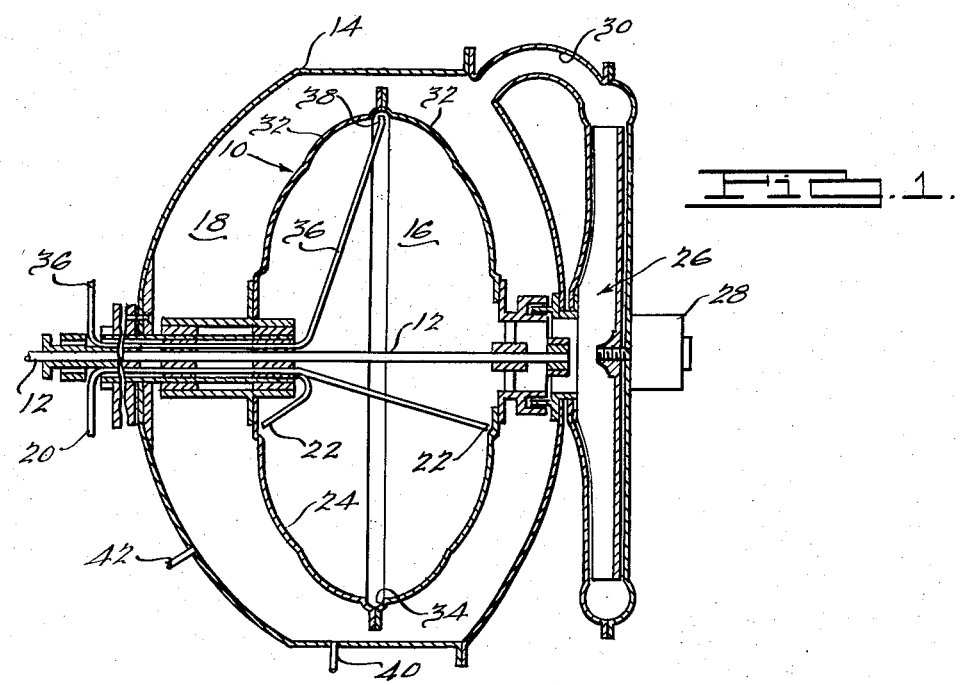
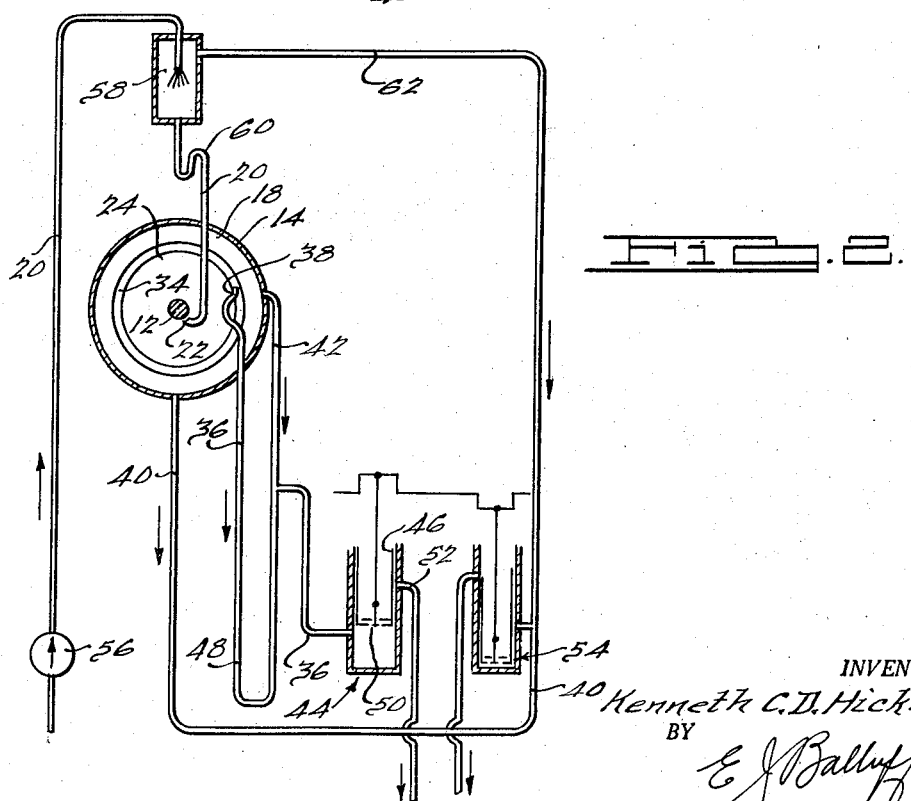
INVENTOR.
Kenneth C.D. Hickman.
BY
E. J. Balluff
ATTORNEY.

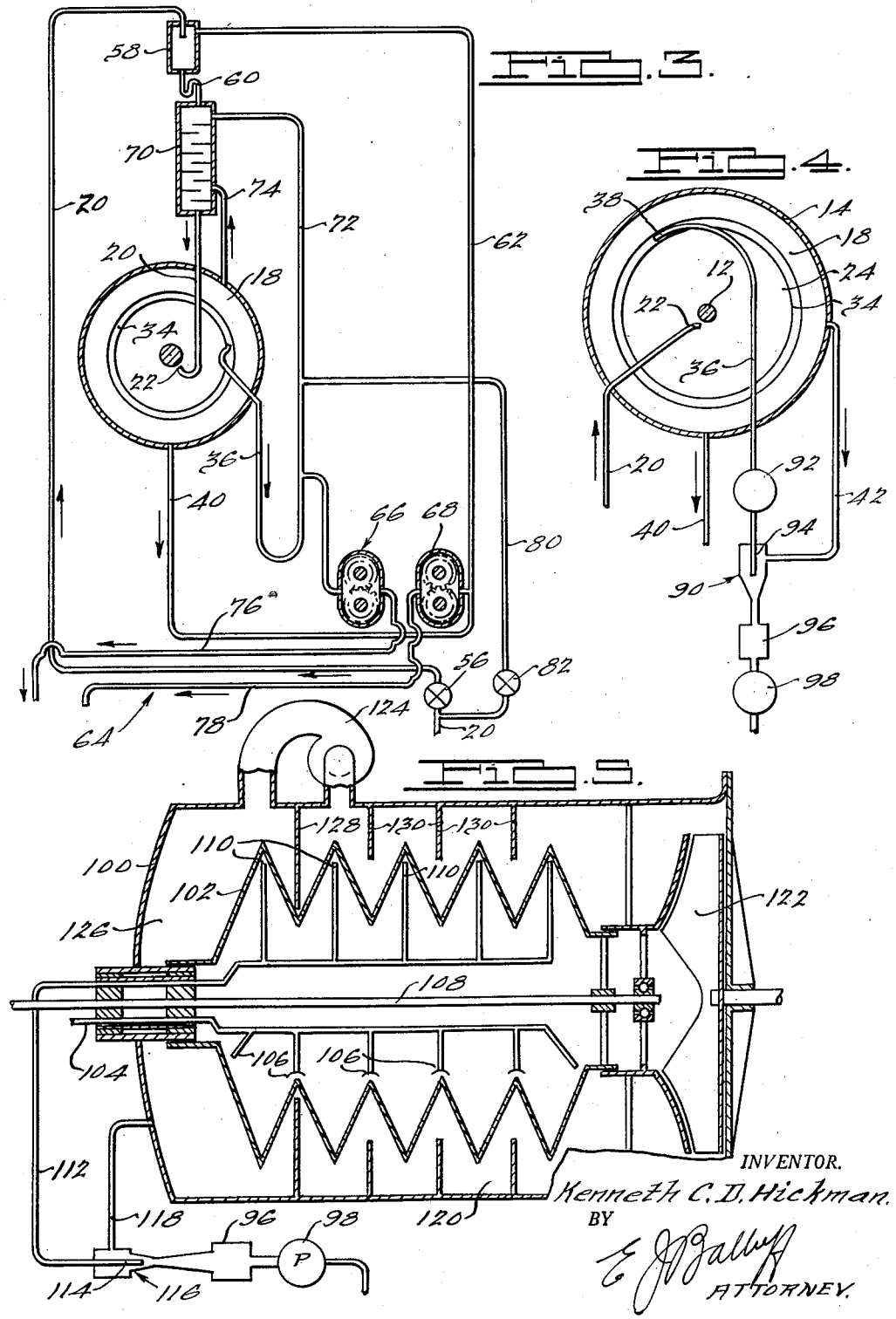

Aug. 11, 1959     K. C. D. HICKMAN     2,899,366
COMPRESSION DISTILLATION
Filed May 25, 1955     4 Sheets-Sheet 3
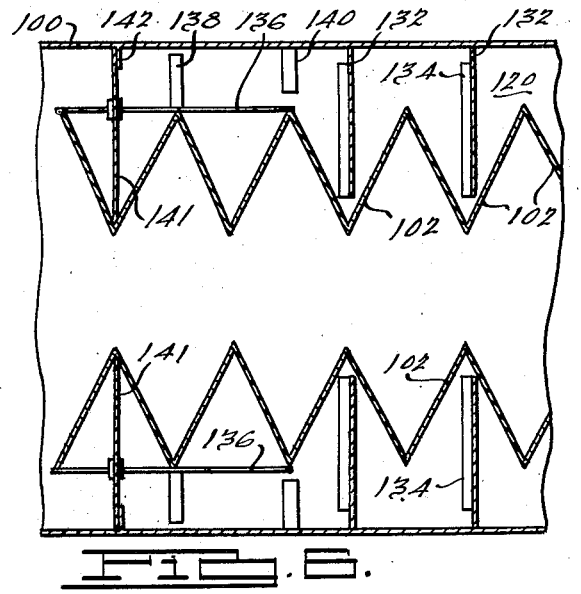
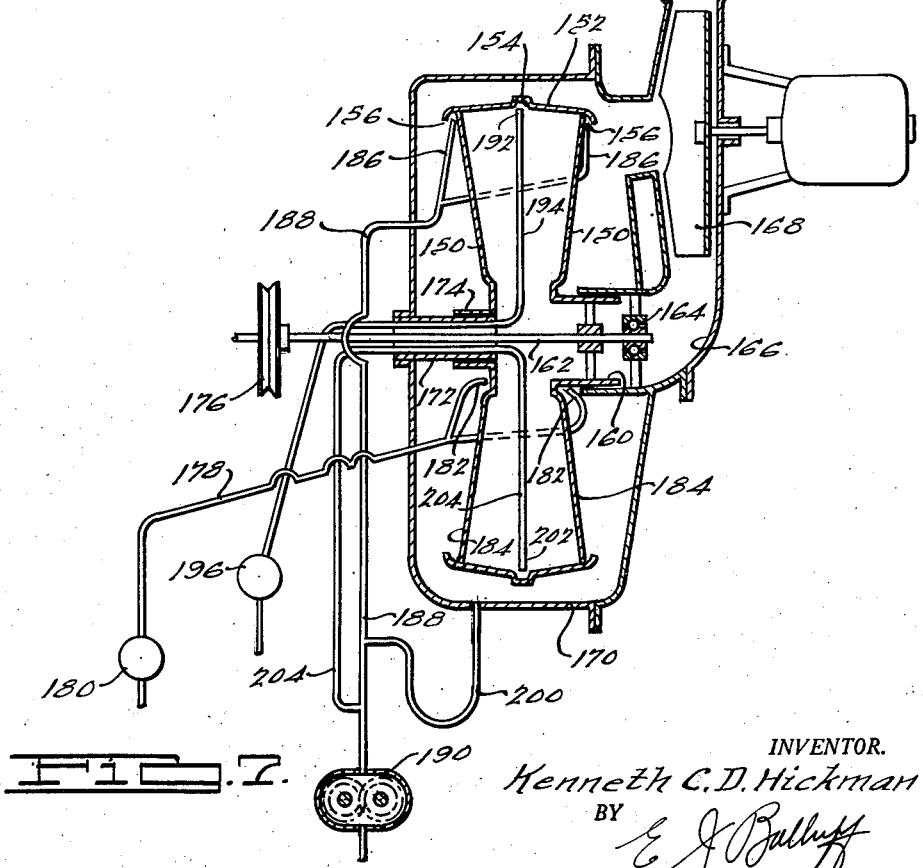
INVENTOR.
Kenneth C. D. Hickman
BY
ATTORNEY.

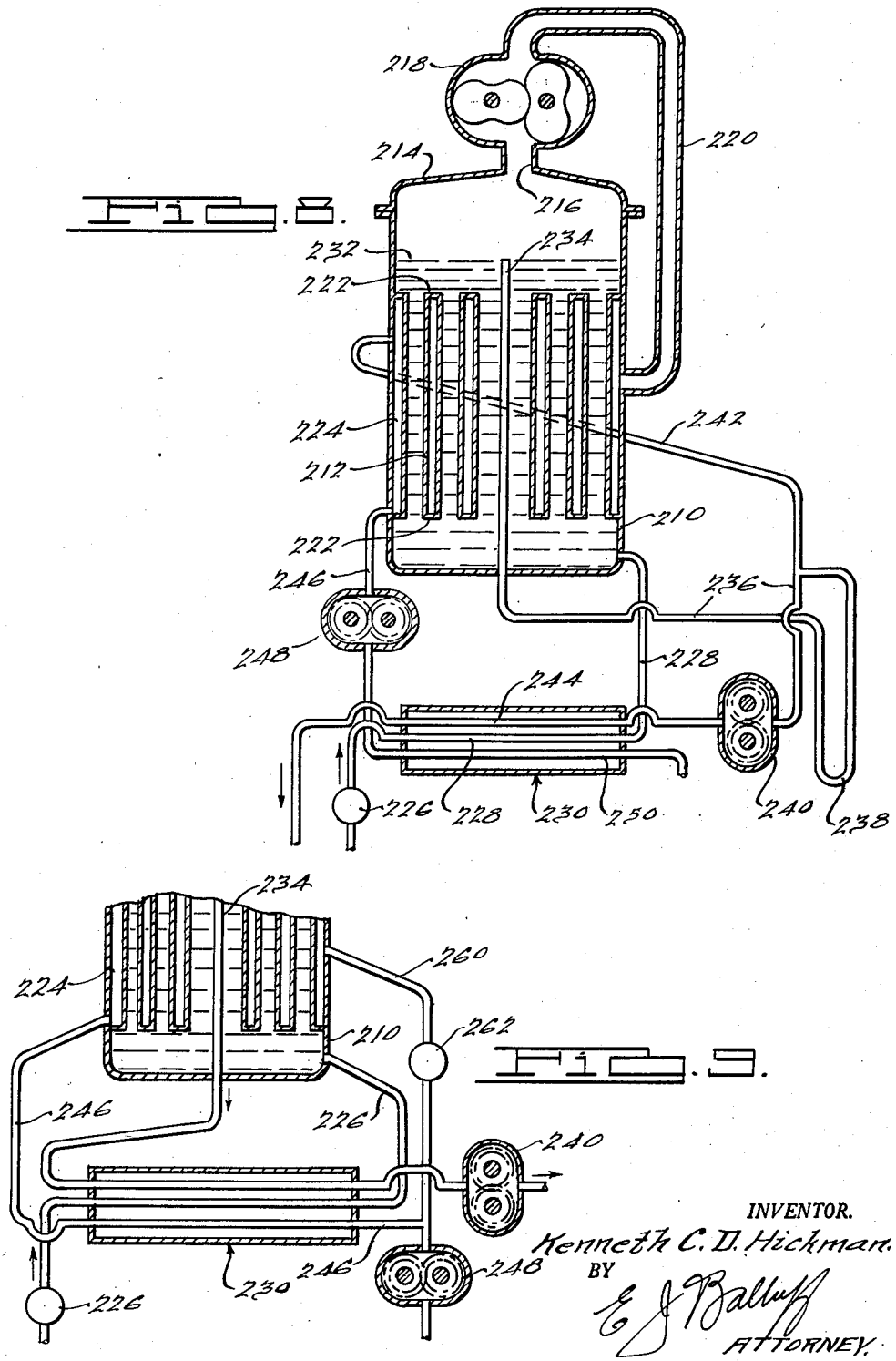

United States Patent Office 2,899,366
Patented Aug. 11, 1959

2,899,366

COMPRESSION DISTILLATION

Kenneth C. D. Hickman, Rochester, N.Y.

Application May 25, 1955, Serial No. 511,067

16 Claims. (Cl. 202—205)

This invention relates to improvements in compression distillation and degassing and purging systems therefor which are especially applicable to the recompression distillation of crude feed water and other liquids under partial vacuum.

Feed solutions for a compression still usually contain dissolved gases which unless continuously removed will accumulate in the system and impair its efficiency. In recompression stills operated at atmospheric pressure it is the practice to bleed off or purge small amounts of steam in order to remove such gases. If the still is operated at reduced pressures, it is difficult to prevent additional air from entering the system through leaks, and as the recompression cycle is quite sensitive, as the vacuum increases, the efficient operation of a compression still under high vacuum has been difficult of attainment. The vacuum itself is ordinarily created by a pump and the perfection and economy of performance of this pump greatly affect the successful operation of the still, and a faulty or inadequate degasser and purge pump may entirely prevent the functioning of the still at the desired low temperature and pressure level.

The vacuum purging process may be divided into three steps. When the feed first enters the system, vapor is evolved explosively and if this mixture of gas and steam is detached in a vessel separate from the still a preliminary degassing is achieved which presents much of the dissolved gas entering the still. In the second step steam is bled from the still and carries with it further quantities of uncondensibles. This step will be defined as purging the still and the discarded steam will be termed purge steam. In the third step extra steam, which may be purge steam, is passed counter current to the previously degassed and preheated feed. Adequate utilization of these three steps will result in the substantially complete removal of interfering gas from the compression cycle.

With extremely high re-usage of the latent heat of evaporation, of the order of 50 times or better, now possible with the centrifugal recompression still disclosed in my prior application hereinafter referred to, it is imperative to keep the discharge of purge steam, which is primary steam containing latent heat not reusable in the compression cycle, to an absolute minimum, otherwise the advantage of the improved efficiency is lost.

Again, in order to remove the purge steam and dissolved gas economically, it is desirable to maintin condensers and wet pumps at temperatures below that of the still. In hot climates an external supply of cooling water may not be readily available.

As the cost of producing distilled water by the recompression still is divided between power, labor and amortization, it is desirable to limit the expenditure of capital and labor to match the lowered usage of power consumed by the improved form of still.

A principal object of the invention therefore is to provide a combination of degassing and purging means for removing interfering gases from compression stills which is particularly applicable to the distillation of crude feed water under partial vacuum.

Another object of the invention is to provide a new and highly efficient method of and apparatus for compression distillation.

Another object of the invention is to provide simple and efficient equipment for removing foreign gas from vacuum operated compression stills wherein such equipment is self-contained and independent of a source of cooling water or an artificial cold sink.

Another object of the invention is to provide a purging means for vacuum compression stills in which the residue withdrawal means serves also as a means for purging foreign gas from the compression or condensing compartment of the still.

Another object of the invention is to provide a purging means for vacuum compression stills in which the distillate withdrawal means serves also as a means for purging gas from the feed or distilland.

A further object of the invention is to combine degassing and purging means with means already available in a vacuum compression still to achieve high efficiency of operation at the minimum expense of investment and maintenance.

Other and further objects of the invention will be apparent from the following description and claims and may be understood by reference to the accompanying drawings, of which there are four sheets, which by way of illustration show preferred embodiments of the invention and what I now consider to be the best mode in which I have contemplated applying the principles of my invention. Other embodiments of the invention may be used without departing from the scope of the present invention as set forth in the appended claims.

In the drawings:

Fig. 1 is a cross-sectional view of a centrifugal type of compression still;

Fig. 2 is a schematic illustration of a degassing and purging system for a still operated at ambient temperatures wherein the vapor space of the condensing chamber is connected to the residue withdrawal means so as to be purged thereby and wherein a degasser for the feed is connected with the distillate withdrawal means of the still for degassing the feed before it enters the still;

Fig. 3 is a schematic illustration of a modified system employed in conjunction with a countercurrent heat exchanger and feed preheater for a still operating above ambient temperatures;

Fig. 4 is a schematic illustration of a modified system employing a venturi suction pump energized by residue discharged from the still;

Fig. 5 is a schematic illustration of a modification showing a multiple rotor centrifugal compression still wherein the compression chamber is compartmented and the purge steam is removed from a compartment remote from the compression stage of the still;

Fig. 6 is a modification of Fig. 5 illustrating the manner in which a baffle system may be employed to diminish the pressure drop through the still;

Fig. 7 is a modification applied to a rotary phase barrier type of compression still in which the compression compartment is inside the rotating barrier instead of outside, as illustrated in Fig. 1;

Fig. 8 is a diagrammatic illustration of the invention applied to a conventional boiler of Kleinschmidt type of still; and Fig. 9 is a modification of Fig. 8 illustrating a system in which the effluent and input streams pass through a countercurrent heat exchanger before the effluent streams enter the withdrawal pumps.

The compression still illustrated in Fig. 1 is of the centrifugal type illustrated in my prior copending application Serial No. 357,493, filed May 26, 1953, for "Compression Distillation Method and Apparatus," to which reference may be had for particulars in addition to those herein described. In this type of still the rotary heat exchange and phase separation barrier indicated generally at 10 is mounted on a shaft 12 for rotation inside a casing 14, the interior of the barrier 10 defining a vaporizing chamber 16 and the space outside the barrier 10 and inside the casing 14 defining a condensing or compression compartment 18.

In practice, distilland or feed conducted through a conduit 20 is continuously supplied to nozzles 22 and discharged therefrom onto the evaporating surface 24 of the barrier, and the barrier by means of the shaft 12 which projects outside the casing 10 through a suitable stuffing box is rotated at sufficient speed so as to distribute and spread the distilland on the surface 24 in a film substantially thinner than can be secured by a flow of such distilland of the same throughput on the same surface under the influence of gravity alone. The vapor evolved by the flowing film of distilland is withdrawn from the evaporating chamber 16 by a rotary vane type of vapor compressor indicated generally at 26 driven by a motor 28 and compressed by such compressor so that it will condense at a temperature above that at which it is evolved, and the compressed vapor is directed into the compression chamber through the conduit 30 into intimate heat exchange relationship with the outer or condensing surface 32 of the barrier so as to condense the vapor on the barrier and to use the heat of condensation thereof to promote the evolution of vapor from the flowing film of distilland on the evaporating surface 24 of the barrier. The rotation of the barrier 10 will separate the condensate from the surface 32 so as to prevent the accumulation of condensate thereon. The barrier is constructed internally to provide an annular gutter or trough 34 in which the residue is collected under the influence of centrifugal force. A residue removal conduit 36 extends into the chamber 16 through the stuffing box and has its end formed as a scoop 38 and disposed in the trough 34 so that upon rotation of the barrier the residue will be collected by the scoop 38 and removed from the still through the conduit 36. Suitable bearings are provided for supporting the barrier 10 for rotation within the casing 14, and suitable seals are provided at the joints so as to prevent escape of fluid from the casing 14 and flow of fluid from one side of the barrier to the other except through the compressor 26.

Distillate collecting in the bottom of the casing 14 is removed through the conduit 40 and the condensing chamber 18 is purged of noncondensible vapors through the conduit 42.

In Fig. 2 the still and the system are schematically illustrated but the same reference characters are employed. As illustrated in Fig. 2, the residue conduit 36 communicates with the intake side of a reciprocating type of pump diagrammatically indicated at 44. The pump 44 is constructed with its entrance port arranged so as to be uncovered at the top of the stroke of the piston 46 thereof, thus allowing residue to flow by gravity into the cylinder of the pump 44. Between the still and the pump 44 the residue conduit is provided with a liquid loop or trap 48. The conduit 42 which communicates at one end with the vapor space of the condensing chamber 18 communicates at its other end with the residue conduit 36 between the loop 48 and the inlet to the pump 44. On the downstroke of the piston 46 of the pump the inlet thereof is covered and the residue plus the entrained gas are forced through the exhaust valve 50 mounted in the head of the piston 46, and thence to atmosphere through the discharge conduit 52. It is important that the residue withdrawal pump 44 should be considerably oversize and thus able to accommodate not only sudden excesses of residue, should such appear, but also to assure the function of a wet vacuum pump which creates the initial vacuum in the still and continues to keep it purged from foreign gas. This it is able to do because the residue from the compression still is necessarily at a lower temperature than the distillate and thus exerts a lower vapor pressure than obtaining in the compression chamber 18 so that steam from the chamber 18 will stream through the conduit 42 to meet the residue in the conduit 36 where it will condense partially and provide an enriched purge gas for withdrawal by the pump 44.

Preferably, the distillate is removed through a conduit 40 and second oversize withdrawal pump 54 and the partial vacuum so obtained is utilized to effect degassing of the feed. As shown in Fig. 2, the feed is metered by a valve 56 in the conduit 20 before it flows into a degassing chamber 58. From the degassing chamber the feed flows by gravity through the liquid sealing loop 60 to the nozzle 22, as previously described.

In the degasser 58 much gas is separated from the feed and removed by conduit 62 which communicates at its other end with the distillate conduit 40 ahead of its communication with the intake side of the distillate withdrawal pump 54. The pump 54 is like the pump 44 and operates in the same manner. Since the distillate from the still will be at a higher temperature than the feed entering the degasser 58, the pump 54 cannot produce a higher vacuum in the degassing chamber 58, but it will, however, withdraw a mixture of gas and steam at a pressure a little above the vapor pressure of the distillate, and I have found that this produces a valuable degree of degassing for the feed especially suitable for small recompression stills.

It will be observed that in Fig. 2 each withdrawal pump is isolated by a liquid loop or seal in the liquid line from the vapor in the compartment in which the liquid withdrawn by such pump originates, and that each pump is connected by an open untrapped line with the vapor space in another compartment. Thus, each pump serves the double function of liquid withdrawal and gas withdrawal. The liquid thus serves to enhance the capacity of the pump as a gas withdrawal pump and to withdraw extra gas due to the condensation of the vapor by reason of its contact with the liquid.

In the modification illustrated in Fig. 3, the construction and operation are the same as those described, except in the following particulars. The feed conduit 20 passes through a triple stream heat exchanger 64 before entering the degasser chamber 58; oversize gear pumps 66 and 68 are used instead of the reciprocating piston type pumps 44 and 54; a counterflow degasser chamber 70 is employed in the feed conduit 20 between the liquid seal 60 and the nozzle 22; and instead of the purge conduit 42 communicating directly with the condensing chamber 18, a purge conduit 72 communicates with the counterflow degasser chamber 70 and thence through the conduit 74 with the vapor space in the compression chamber 18. In addition, the residue after being discharged from the residue withdrawal pump 66 is routed through the heat exchanger 64 by means of conduit 76 and the distillate after being discharged from the distillate withdrawal pump 68 is routed through the heat exchanger 64 by means of the conduit 78. Also, the distillate withdrawal conduit 40 may pass through the heat exchanger 64 before its connection with the intake of the distillate withdrawal pump 68. Also, a conduit 80 may interconnect the feed conduit 20 and the vapor conduit 72 so as to admit small quantities of raw cold distilland to the vapor conduit 72 under the control of a valve 82. The steam and gas detached from the distilland in the degasser 58 are withdrawn through conduit 62 by the oversize distillate withdrawal pump 68 and the residue is withdrawn through the conduit 36 and the residue withdrawal pump 66 which also serves to withdraw purge steam from the counterflow degasser through the conduit 72.

Fig. 4 illustrates an alternative arrangement wherein purging of the condensing chamber is accomplished by a venturi ejector pump 90. The liquid head to operate the ejector may be obtained from the kinetic energy stored in the residue at the rim of the rotary phase barrier 24, or it may be obtained in part therefrom and in part from an auxiliary mechanical pump, or all from a mechanical pump. Thus, in Fig. 4 the feed scoop 38 of the residue removing conduit 36 is in the form of a streamlined Pitot tube which dips into the oncoming annular pool of residue in the trough 34. The residue thus collected is forced through either a nonreturn valve or a mechanically operated booster pump 92 and discharged from the nozzle 94 into the throat of the ejector 90. Steam and gas from the condensing chamber 18 are conducted through the conduit 42 to the venturi of the ejector 90 and are condensed and compressed into the vessel 96 and thence to atmosphere. If desired, the residue and entrained gases may be supplied to a second mechanical pump 98 for discharge under pressure.

Fig. 5 illustrates a modification wherein the arrangement illustrated in Fig. 4 is applied to the purging of a multiple unit still of the type illustrated in Fig. 1. In the structure shown in Fig. 5 the casing 100 houses, for example, a unit comprising five rotary heat exchange and phase separation barriers 102 of the kind illustrated in Fig. 1. Distilland is supplied through a feed conduit 104 to the nozzles 106 which discharge the distilland onto the evaporating surfaces of the barriers 102 as the same is rotated by means of the shaft 108 in a manner as described in connection with Fig. 1. The residue is removed by a series of scoops 110 which project into the annular troughs formed in the barriers in a manner similar to that shown in Fig. 1, and the residue is conducted through a residue withdrawal conduit 112 and discharged from the nozzle 114 of an ejector 116, as described in connection with Fig. 4.

The suction side of the ejector is connected by a conduit 118 with a condensing chamber 126 within the casing 100. Vapor evolved within the barriers 102 during the operation thereof is withdrawn through one end of the barrier unit by a motor driven compressor 122 which is adapted to compress such vapor and discharge it into the condensing chamber 120 formed between the interior of the casing 100 and the exterior of the barriers 102, the vapor flowing lengthwise of the barriers and condensing upon the outer surfaces thereof. Except for the fact that the still illustrated in Fig. 5 has a series of rotary phase barriers, its construction and operation so far as the evolution of vapor on the inside thereof and the condensing of the vapor on the outside thereof are concerned, are the same as described in connection with Fig. 1.

As the vapor flows lengthwise of the condensing chamber 120 away from the compressor 122, the ratio of uncondensible gases to steam increases with each stage, while the head of steam falls from stage to stage. Thus the barriers 102 remote from the compressor 122 are less effective and the terminal barrier may entirely fail to function. While this difficulty can be minimized to some extent by bleeding off steam and gases at various points along the casing 100, all such steam so purged is lost to the recompression cycle.

Instead of employing such an inefficient expedient, I withdraw all of the purge steam from the casing at a point intermediate the barriers 102 and recompress the same by means of a secondary compressor 124 which discharges into a compression chamber 126 which surrounds the last one of the barriers 102. For this purpose the barrier 102 most remote from the compressor 122 is isolated from the condensing chamber 120 by a vapor-tight baffle 128 which has a running sealing relation with the barrier 102. The final purge steam removed by the ejector 116 is removed by the conduit 118 from the chamber 126.

A series of annular baffles 130 may be arranged on the interior of the casing to compartment the condensing chamber 120 and to direct the compressed vapors into more intimate contact with the condensing surfaces of the barriers 102. The degassing system employed in connection with Fig. 5 will operate in a manner similar to that described in connection with Fig. 4. It is to be understood that the modifications illustrated in Figs. 4 and 5 are provided with the feed water degassing systems as illustrated in either Fig. 2 or Fig. 3.

Fig. 6 illustrates a modification of Fig. 5 wherein annular sheet material rings 132 internally disposed within the casing 100 are employed to segregate the steam around each of the barriers 102. These rings may present a relatively open path for the steam or the rings may be made more extensive and provided with radial blades 134 which cut into the rotating body of steam within the chamber 120 and impel it toward the end of the casing remote from the compressor 122, thus reducing or eliminating the pressure drop. The blades may be formed out of the sheet material of the rings 132 by forming fan-shaped slots therein and such slots may be progressively larger near the compressor end of the casing than remote therefrom. Where the rotary barriers 102 are tied together with spacers 136 at their peripheries, fan blades 138 may be secured thereto and/or fan blades 140 may be internally secured in the casing, all for the purpose of equalizing the pressures within the casing and outside of the barriers 102 from one end to the other thereof. In lieu of the stationary ring 128 as shown in Fig. 5, an annular baffle 141 sealed to the barriers 102 and fastened to the tie rods 136, and thus rotating with the phase barrier unit, may cooperate with a stationary sealing ring 142 to constitute a closure so as to form an end compartment like 126 from which the purge steam may be removed in the manner previously indicated.

In the embodiments heretofore discussed the evaporation chamber is on the inside of the rotary phase barrier so that purging of uncondensible gases has been applied to the casing of the still where the pressure is highest. In the embodiment illustrated in Fig. 7, the situation is reversed as the evaporation chamber is on the outside of the rotor and the steam is condensed on the inside thereof. In such case the purge steam must be removed from the inside of the rotor. In this modification, the sides of the annular rotary phase barrier 150 are joined together and closed at their outer peripheries by a cylindrical closure 152 provided internally with an annular trough 154 and externally with two annular gutters 156. The rotary phase barrier 150 at one end is provided with a hub 160 internally provided with a spider fixed on a shaft 162, one end of the shaft being journaled in bearing 164 and the bearing 164 being mounted in a spider in the discharge conduit 166 of the rotary compressor 168. Sealing means are provided for the joint between the hub and the end of conduit 166. The shaft 162 projects outwardly of the rotary barrier 150 and of the casing 170 through a bearing block 172 which is supported by one end of the casing 170. The inner periphery of the barrier 150 surrounding the bearing block 172 is formed to provide a sleeve 174 which has a running sealing fit with the outer periphery of the bearing block. A pulley 176 is mounted on the shaft 162 for rotating the same and the rotary phase barrier assembly 150, 152.

Distilland is supplied through a conduit 178 under the control of a metering valve 180 to nozzles 182 which discharge the distilland onto the evaporating surface 184 of the rotary phase barrier during the rotation thereof so that the distilland will be spread and distributed in a thin film on the evaporating surfaces 184 in a manner as described in connection with Fig. 1. The residue is collected in annular troughs 156 and picked up by scoops 186 communicating with the residue withdrawal conduit 188 which is connected to the intake of an oversize residue withdrawal pump 190 of the gear type. The space inside the casing 170 and outside the rotary phase barrier 150 forms an evaporating chamber, while the space inside the barrier 150 forms a condensing chamber. Vapor is withdrawn from the interior of the casing and compressed by the motor driven blower 168 and delivered to the inside of the rotary phase barrier through the volute and manifold 166. Condensate collects in the annular trough 154 and is picked up by a scoop 192 and led out of the still by a conduit 194 which externally of the still is connected with a check valve or distillate withdrawal pump indicated generally at 196.

A branch conduit 200 communicating at one end with the conduit 188 and at the other end with the bottom of the casing 170 serves to remove any residue that may collect in the bottom of the casing, and this branch conduit 200 is provided with a loop so as to provide a liquid seal between the pump 190 and the interior of the casing. Purge steam is picked up near the inner periphery of the rotary phase barrier assembly by a scoop 202 communicating with a conduit 204 which at its other end communicates with the residue withdrawal conduit 188 as illustrated. The distilland supplied through the feed conduit 178 may be degassed in accordance with any of the degassing systems herein disclosed.

Fig. 8 schematically illustrates a Kleinschmidt type of still comprising a boiler shell 210 internally provided with a series of tubes 212 and closed at the top by a steam dome 214. The intake 216 of a Roots type positive displacement blower 218 communicates with the vapor space in the top of the boiler while the discharge side of the blower 218 is connected by a conduit 220 to the space surrounding the tubes 212 which is separated from the liquid in the boiler shell 210 by the headers 222 in which the tubes 212 are mounted, this space functioning as a condensing chamber 224.

Distilland degassed by any of the arrangements hereinbefore disclosed is supplied under the control of metering valve 226 through feed conduit 228 to the bottom of the boiler after passing through a three-way heat exchanger 230 similar to that indicated at 64 in Fig. 3. The surface of the liquid in the boiler is indicated at 232, and the vapor evolved is collected in the upper part of the boiler and removed therefrom by the blower 218 as previously described. The standpipe 234 serves to fix the maximum liquid level 232 and also serves to remove the residue, the standpipe being connected at its bottom end to the residue withdrawal conduit 236 which is connected through liquid trap 238 with the intake of the oversize residue withdrawal pump 240. Purge steam is withdrawn from the condensing chamber 224 at a point remote from the vapor conduit 220 by means of a conduit 242 which is connected with the residue withdrawal conduit 236 between the liquid trap 238 and the inlet to the pump 240. The pump 240 discharges the mixture of residue and purge steam through the conduit 244 which forms a part of the heat exchanger 230, and thence to atmosphere.

Distillate is withdrawn from the condensing chamber 224 through the conduit 246 and distillate withdrawing pump 248 and is then routed by conduit 250 through the heat exchanger 230. Alternatively, the pump 248 may be arranged downstream of the heat exchanger 230 as illustrated in Fig. 9. Degassing of the feed for the still shown in Fig. 8 may be accomplished in accordance with any of the arrangements herein disclosed.

The arrangement illustrated in Fig. 8 affords relatively low pressure differentials for purging contaminated steam but it fully preserves the countercurrent conservation of heat in a still which is operated at temperatures substantially higher than the source of feed water. Where stronger purging is desired, for instance where highly contaminated harbor, river or industrial effluent water forms the feed, the residue from the standpipe 234 may be passed through the triple flow heat exchanger 230 as shown in Fig. 9 before it is supplied to the residue withdrawal pump 240 and discharged to atmosphere. The distillate is withdrawn from the condensing chamber 224 through the conduit 246 which passes through the heat exchanger 230 before connection with the inlet to the distillate withdrawal pump 248, and purge steam may be removed from the condensing chamber 224 through the conduit 260 which communicates with the distillate withdrawal conduit 246 ahead of the inlet to the pump 248 and downstream of the heat exchanger 230. An adjustable valve 262 limits the exit of purge steam from the condensing chamber 224. Any of the degassing and/or purge systems illustrated may be employed with any of the stills illustrated or with any other type of compression still, and degassing of the feed may under some conditions be employed without purging of the condensing chamber, and vice versa.

It is also contemplated that the inventions herein disclosed may be employed in connection with compression stills and at the pressure and temperature levels as disclosed in my prior application Serial No. 383,504, filed October 1, 1953, for "Compression Distillation Method and Apparatus."

While I have illustrated and described preferred embodiments of my invention, it is understood that these are capable of modification, and I therefore do not wish to be limited to the precise details set forth but desire to avail myself of such changes and alternations as fall within the purview of the following claims.

I claim:

1. In a compression still having an evaporating chamber, a condensing chamber, a heat exchange and phase separation barrier separating said chambers and providing for the transfer of heat between the fluid therein, means for withdrawing vapor from said evaporating chamber, compressing said vapor and discharging the same into said condensing chamber, and means for supplying liquid feed to said evaporating chamber; means including a liquid trap for withdrawing residue from said evaporating chamber, a communication between said condensing chamber and said residue withdrawing means by means of which said condensing chamber is continuously purged by said residue withdrawing means during withdrawal of residue by said residue withdrawing means, means including a liquid trap for withdrawing distillate from said condensing chamber, and means including a communication between said feed supplying means and said distillate withdrawing means for degassing said feed, said residue and distillate withdrawing means and communications including provisions for preventing flow of fluid thereby between said condensing and evaporating chambers.

2. In a compression still having an evaporating chamber, a condensing chamber, a heat exchange and phase separation barrier separating said chambers and providing for the transfer of heat between the fluid therein, means for withdrawing vapor from said evaporating chamber, compressing said vapor and discharging the same into said condensing chamber, a degassing chamber and means for supplying feed to said degassing chamber and from said degassing chamber to said evaporating chamber; means including a liquid trap for withdrawing residue from said evaporating chamber, a communication between said condensing chamber and said residue withdrawing means for purging said condensing chamber during withdrawal of residue by said residue withdrawing means, means including a liquid trap for withdrawing distillate from said condensing chamber and a communication between said degassing chamber and said distillate withdrawing means for withdrawing gas separated from said feed in said degassing chamber.

3. In a compression still having an evaporating chamber, a condensing chamber, a heat exchange and phase separation barrier separating said chambers and providing for the transfer of heat between the fluid therein, means for withdrawing vapor from said evaporating chamber, compressing said vapor and discharging the same into said condensing chamber, a primary degassing chamber and a counterflow degassing chamber connected in series-flow relationship and means for supplying feed to said primary degassing chamber and from said counterflow degassing chamber to said evaporating chamber; means including a liquid trap for withdrawing residue from said evaporating chamber, a vapor communication between said condensing chamber and the lower end of said counterflow degassing chamber for purging said condensing chamber, a vapor communication between the upper end of said counterflow degassing chamber and said residue withdrawing means for withdrawing the steam purged from said condensing chamber, means including a liquid trap for withdrawing distillate from said condensing chamber, and a communication between said primary degassing chamber and said distillate withdrawing means for purging and withdrawing gas from said primary degassing chamber.

4. In a compression still having an evaporating chamber, a condensing chamber, a heat exchange and phase separation barrier separating said chambers and providing for the transfer of heat between the fluid therein, means for withdrawing vapor from said evaporating chamber, compressing said vapor and discharging the same into said condensing chamber, and means for supplying liquid feed to said evaporating chamber; means including a liquid trap for withdrawing residue from said evaporating chamber, said feed supplying means including a primary degasser and a counterflow degasser arranged in series-flow relationship in the order named ahead of said evaporating chamber, a vapor communication between said condensing chamber and said counterflow degasser through which purge steam is withdrawn from said condensing chamber, and means communicating with the upper end of said counterflow degasser for withdrawing purge steam therefrom, means including a liquid trap for withdrawing distillate from said condensing chamber, and means actuated by said distillate withdrawing means for withdrawing gas from said primary degasser.

5. In a compression still having an evaporating chamber, a condensing chamber, a heat exchange and phase separation barrier separating said chambers and providing for the transfer of heat between the fluid therein, means for withdrawing vapor from said evaporating chamber, compressing said vapor and discharging the same into said condensing chamber, and means for supplying feed to said evaporating chamber; means including a liquid trap for withdrawing residue from said evaporating chamber, means actuated by said residue withdrawing means for purging said condensing chamber during withdrawal of residue by said residue withdrawing means, means including a liquid trap for withdrawing distillate from said condensing chamber, and means actuated by said distillate withdrawing means for degassing said feed.

6. In a compression still having an evaporating chamber, a condensing chamber, a heat exchange and phase separation barrier separating said chambers and providing for the transfer of heat between the fluid therein, means for withdrawing vapor from said evaporating chamber, compressing said vapor and discharging the same into said condensing chamber, and means for supplying feed to said evaporating chamber; means including a liquid trap for withdrawing distillate from said condensing chamber, and means actuated by said distillate withdrawing means for degassing said feed before it is supplied to said evaporating chamber and during withdrawal of distillate by said distillate withdrawing means.

7. In a compression still having an evaporating chamber, a condensing chamber, a heat exchange and phase separation barrier separating said chambers and providing for the transfer of heat between the fluid therein, means for withdrawing vapor from said evaporating chamber, compressing said vapor and discharging the same into said condensing chamber, and means for supplying feed to said evaporating chamber; means including a liquid trap for withdrawing distillate from said condensing chamber and said feed supplying means including a degasser disposed ahead of said evaporating chamber, and a vapor communication between said degasser and said distillate withdrawing means for withdrawing gas from said degasser during withdrawal of distillate by said distillate withdrawing means.

8. In a compression still having an evaporating chamber, a condensing chamber, a heat exchange and phase separation barrier separating said chambers and providing for the transfer of heat between the fluid therein, means for withdrawing vapor from said evaporating chamber, compressing said vapor and discharging the same into said condensing chamber, and means for supplying feed to said evaporating chamber; means for withdrawing distillate from said condensing chamber, a vapor communication between said feed supplying means and said distillate withdrawing means for continuously withdrawing entrained gas from said feed during withdrawal of distillate by said distillate withdrawing means, and said distillate withdrawing means and said communication including a liquid trap to prevent fluid flow thereby between said condensing chamber and said feed supplying means.

9. A compression still comprising an evaporating chamber provided with means for supplying feed thereto, a condensing chamber, a heat exchange and phase separation barrier separating said chambers and providing for the transfer of heat between the fluids in said chambers, means for withdrawing vapor from said evaporating chamber, compressing said vapor, and discharging the same into said condensing chamber where said vapor condenses as distillate on said barrier, and liquid pumping means having a vapor communication with said condensing chamber for continuously purging the same, and a liquid communication with said evaporating chamber for continuously withdrawing residue therefrom simultaneously with the purging of vapor from said condensing chamber, said liquid communication including a liquid trap which is operatively disposed between said chambers.

10. A compression still comprising an evaporating chamber provided with means for supplying feed thereto, a condensing chamber, a heat exchange and phase separation barrier separating said chambers and providing for the transfer of heat between the fluid in said chambers, means for withdrawing vapor from said evaporating chamber, compressing said vapor, and discharging the same into said condensing chamber, and liquid pumping means supplied with residue and having a vapor communication with said feed supplying means for degassing said feed before it is supplied to said evaporating chamber.

11. A still according to claim 4 wherein said condenser purging means is actuated by said residue withdrawing means.

12. A compression still comprising an evaporating chamber provided with means for supplying feed thereto, a condensing chamber, a heat exchange and phase separation barrier separating said chambers and providing for the transfer of heat between the fluid in said chambers, means for withdrawing vapor from said evaporating chamber, compressing said vapor, and discharging the same into said condensing chamber, means including a pump, the intake of which is connected with said evaporating chamber for withdrawing residue from said evaporating chamber, a vapor connection between said condensing chamber and the intake of said pump through which steam is purged from said condensing chamber, said means for withdrawing residue from said evaporating chamber including a liquid trap to isolate said pump from vapor in said evaporating chamber.

13. A compression still comprising an evaporating chamber provided with means for supplying feed thereto, a condensing chamber, a heat exchange and phase separation barrier separating said chambers and providing for the transfer of heat between the fluid in said chambers, means for withdrawing vapor from said evaporating chamber, compressing said vapor, and discharging the same into said condensing chamber, means including a liquid trap for withdrawing residue from said evaporating chamber, means for purging steam from said condensing chamber, and means for mixing said residue with said steam as it is purged from said condensing chamber.

14. A compression still comprising an evaporating chamber provided with means for supplying feed thereto, a condensing chamber, a heat exchange and phase separation barrier separating said chambers and providing for the transfer of heat between the fluid in said chambers, means for withdrawing vapor from said evaporating chamber, compressing said vapor, and discharging the same into said condensing chamber, means for withdrawing residue from said evaporating chamber, a conduit including a liquid trap through which residue is discharged from said evaporating chamber, and a vapor connection between said condensing chamber and said conduit on the downstream side of said trap.

15. A compression still comprising an evaporating chamber provided with means for supplying feed thereto, a condensing chamber, a heat exchange and phase separation barrier separating said chambers and providing for the transfer of heat between the fluid in said chambers, means for withdrawing vapor from said evaporating chamber, compressing said vapor, and discharging the same into said condensing chamber, means for withdrawing residue from said evaporating chamber, and a conduit through which residue is discharged from said evaporating chamber, said conduit communicating with said condensing chamber so as to purge steam therefrom during the discharge of residue from said evaporating chamber, and means including a liquid trap in said conduit to prevent fluid flow between said chambers.

16. A compression still comprising an evaporating chamber, a condensing chamber, a heat exchange and phase separation barrier separating said chambers and providing for the transfer of heat between the fluids in said chambers, means for withdrawing vapor from said evaporating chamber, compressing said vapor, and discharging the same into said condensing chamber, a conduit through which feed is supplied to said evaporating chamber, a conduit through which distillate is removed from said condensing chamber, a conduit communicating with the upper end of said condensing chamber for purging the same, said conduits being arranged in heat exchange relation, and means including a pump supplied with residue from said evaporating chamber operatively disposed in said purging conduit.

References Cited in the file of this patent

UNITED STATES PATENTS

| | | |
|---|---|---|
| 1,966,938 | Stone | July 17, 1934 |
| 2,136,774 | Hickman | Nov. 15, 1938 |
| 2,441,361 | Kirgin | May 11, 1948 |
| 2,537,259 | Cleaver | Jan. 9, 1951 |
| 2,613,177 | Worthen | Oct. 7, 1952 |
| 2,637,684 | Buffin | May 5, 1953 |
| 2,759,882 | Worthen et al. | Aug. 21, 1956 |

FOREIGN PATENTS

| | | |
|---|---|---|
| 882,282 | France | Feb. 22, 1943 |
| 438,251 | Italy | Apr. 21, 1947 |
| 448,835 | Italy | May 27, 1949 |